United States Patent
Watabe et al.

(10) Patent No.: US 11,371,875 B2
(45) Date of Patent: Jun. 28, 2022

(54) NONDESTRUCTIVE INSPECTION METHOD AND NONDESTRUCTIVE INSPECTION SYSTEM

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventors: Kazuo Watabe, Kanagawa (JP); Toshiki Takayasu, Kanagawa (JP); Takashi Usui, Saitama (JP); Yoshiyuki Sakamoto, Tokyo (JP); Isao Takahashi, Tokyo (JP)

(73) Assignees: KABUSHIKI KAISHA TOSHIBA, Tokyo (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 124 days.

(21) Appl. No.: 17/005,561

(22) Filed: Aug. 28, 2020

(65) Prior Publication Data
US 2021/0181011 A1   Jun. 17, 2021

(30) Foreign Application Priority Data
Dec. 16, 2019   (JP) .............................. JP2019-226708

(51) Int. Cl.
*B61K 9/02* (2006.01)
*G01N 23/225* (2018.01)
*G01M 5/00* (2006.01)
*G01M 17/08* (2006.01)
*G01N 29/00* (2006.01)
*G01G 19/04* (2006.01)

(52) U.S. Cl.
CPC ............. *G01G 19/042* (2013.01); *B61K 9/02* (2013.01); *G01N 23/225* (2013.01); *G01M 5/0033* (2013.01); *G01M 17/08* (2013.01); *G01N 29/00* (2013.01)

(58) Field of Classification Search
CPC ........... G01N 23/225; G01N 2223/646; G01N 2223/692; G01N 29/00; G01M 5/0033; G01M 17/08; G01G 19/042; B61K 9/02
See application file for complete search history.

(56) References Cited

U.S. PATENT DOCUMENTS

| 4,468,966 | A | * | 9/1984 | Bradshaw | ............ | G01N 29/265 |
| | | | | | | 73/636 |
| 4,472,346 | A | * | 9/1984 | Takeda | ................. | G21C 17/032 |
| | | | | | | 73/633 |

(Continued)

FOREIGN PATENT DOCUMENTS

JP   2019-174180 A   10/2019

*Primary Examiner* — Natalie Huls
(74) *Attorney, Agent, or Firm* — Finnegan, Henderson, Farabow, Garrett & Dunner L.L.P.

(57) ABSTRACT

According to an embodiment, a nondestructive inspection method includes: detecting, by a plurality of sensors installed in a truck that supports a vehicle body, an elastic wave generated when a lifting member inserted between the vehicle body and the truck moves the vehicle body up and down; and estimating, by an evaluation device, a position of a defect in the truck, based on the elastic wave detected by the plurality of sensors.

8 Claims, 6 Drawing Sheets

(56) References Cited

U.S. PATENT DOCUMENTS

| | | | | |
|---|---|---|---|---|
| 4,689,995 | A | * | 9/1987 | Turbe .................... G01N 29/265 |
| | | | | 73/636 |
| 5,603,556 | A | * | 2/1997 | Klink .................... B60T 13/665 |
| | | | | 303/22.7 |
| 2014/0069193 | A1 | * | 3/2014 | Graham ................. G01N 29/04 |
| | | | | 73/584 |
| 2015/0291192 | A1 | * | 10/2015 | Li ......................... B61L 23/047 |
| | | | | 246/121 |
| 2016/0178484 | A1 | * | 6/2016 | Ma ........................ G01M 17/08 |
| | | | | 73/146 |
| 2016/0282223 | A1 | * | 9/2016 | Yamazaki ............. G01M 17/10 |
| 2020/0148237 | A1 | * | 5/2020 | Kawauchi ........... B61L 15/0081 |
| 2020/0198672 | A1 | * | 6/2020 | Underwood ........... G01N 29/07 |
| 2020/0290656 | A1 | * | 9/2020 | Tione ....................... B61K 9/12 |
| 2021/0078619 | A1 | * | 3/2021 | Morita ................. B61L 23/042 |
| 2021/0302271 | A1 | * | 9/2021 | Ko ....................... B62D 65/005 |

\* cited by examiner

NONDESTRUCTIVE INSPECTION METHOD AND NONDESTRUCTIVE INSPECTION SYSTEM

CROSS-REFERENCE TO RELATED APPLICATIONS

This application is based upon and claims the benefit of priority from Japanese Patent Application No. 2019-226708, filed on Dec. 16, 2019; the entire contents of which are incorporated herein by reference.

FIELD

Embodiments described herein relate generally to a nondestructive inspection method and a nondestructive inspection system.

BACKGROUND

Occurrence of damage resulting from a fatigue crack in a structure made up of steel or other materials has been a social challenge, and a sign detection method is widely called for by which to detect occurrence of damage before being in a critical situation. For example, a sign detection method is called for by which to detect occurrence of damage resulting from a fatigue crack on a railroad truck before being in a critical situation.

DETAILED DESCRIPTION

According to an embodiment, a nondestructive inspection method includes: detecting, by a plurality of sensors installed in a truck that supports a vehicle body, an elastic wave generated when a lifting member inserted between the vehicle body and the truck moves the vehicle body up and down; and estimating, by an evaluation device, a position of a defect in the truck, based on the elastic wave detected by the plurality of sensors.

Embodiments of a nondestructive inspection method and a nondestructive inspection system will be described in detail below with reference to the accompanying drawings.

In the nondestructive inspection method according to an embodiment, a highly sensitivity sensor (AE sensor) detects an elastic wave (acoustic emission: AE) generated along with an internal crack occurring or proceeding as damage or along with a crack interface being rubbed. The highly sensitivity sensor may be a sensor that detects a physical quantity. The highly sensitivity sensor may be, for example, an acceleration sensor, a microphone, and a temperature sensor, apart from an acoustic emission (AE) sensor, and may be other sensors as long as the sensor is capable of detecting a physical quantity. The sensor converts the detected physical quantity into an electric signal.

With an AE signal, a crack can be detected as an indication before resulting in a scale of being identifiable visually, so that an AE signal is useful as an index of the soundness of materials. For this reason, technologies have been studied actively with which to detect a sign of deterioration of a structure by an AE method. In a corrosion diagnosis of an oil storage tank and a process for manufacturing a machine in particular, detection technologies using AE methods are widely used, mostly in the West, and are also standardized.

The following embodiment will describe a case of inspecting a truck for a railroad vehicle that transports freight or passengers, as an example.

Figure 1:
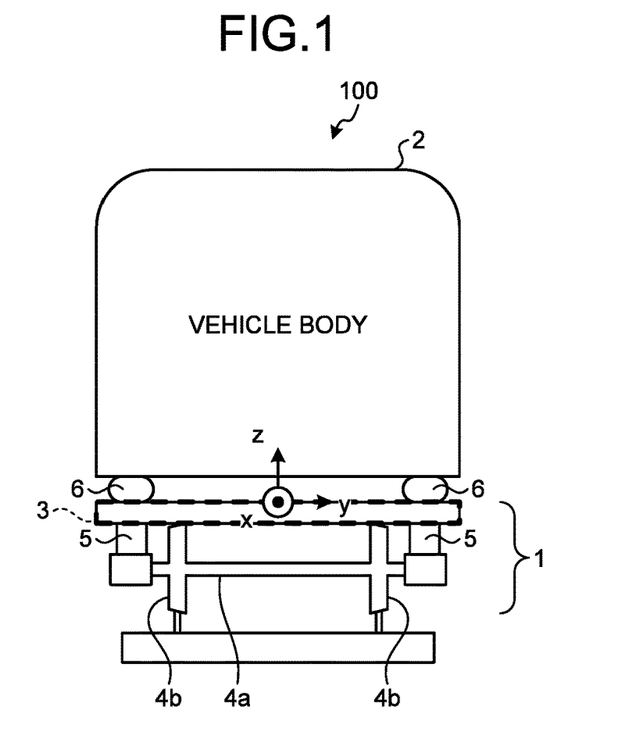
FIG. 1 is a schematic view illustrating an example of a railroad vehicle when viewed from the front.
Figure 2:
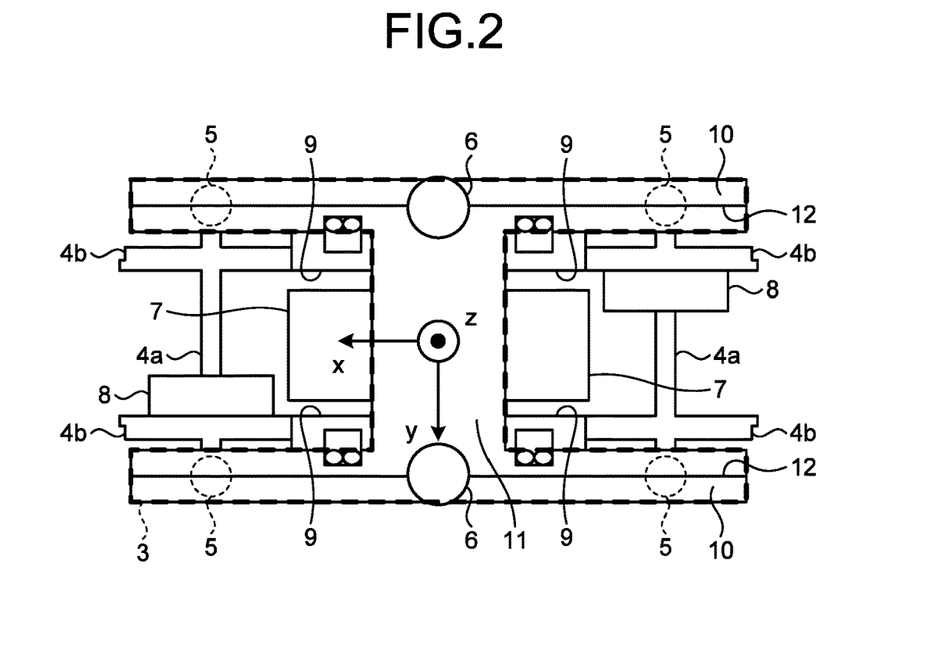
FIG. 2 is a schematic view illustrating an example of a truck when viewed from above.

FIG. 1 is a schematic view illustrating an example of a railroad vehicle 100 when viewed from the front. FIG. 2 is a schematic view illustrating an example of a truck 1 when viewed from above. The truck 1 is a running gear that supports the load of a vehicle body 2 and that also transfers driving force and brake force. The truck 1 includes a truck frame 3, an axle 4a, wheels 4b, a primary suspension 5, a secondary suspension 6, a motor 7, gears 8, and brakes 9.

The truck frame 3 is a key component that determines structural strength of the truck 1, has two side beams 10 present along the direction in which the truck 1 is traveling, and has a horizontal beam 11 disposed in a direction orthogonal to the two side beams 10 in order to provide coupling therebetween. In particular, the side beams 10 are components at high risk for breakage because they directly experience traveling disturbance that has been transmitted from the wheels 4b. The side beams 10 themselves are assembled by welding stamped steel sheets. A defect in welds 12 can gradually grow while the truck 1 is running and can result in breakage as a whole, so that early detection of defects is expected.

The primary suspension 5 is a component that couples the truck frame 3 to a wheel and axle (a component in which the axle 4a and the wheels 4b are combined). For the primary suspension 5, coil springs are mainly used.

The secondary suspension 6 is a component that couples the vehicle body 2 to the truck frame 3. For the secondary suspension 6, air springs are mainly used.

Figure 3:
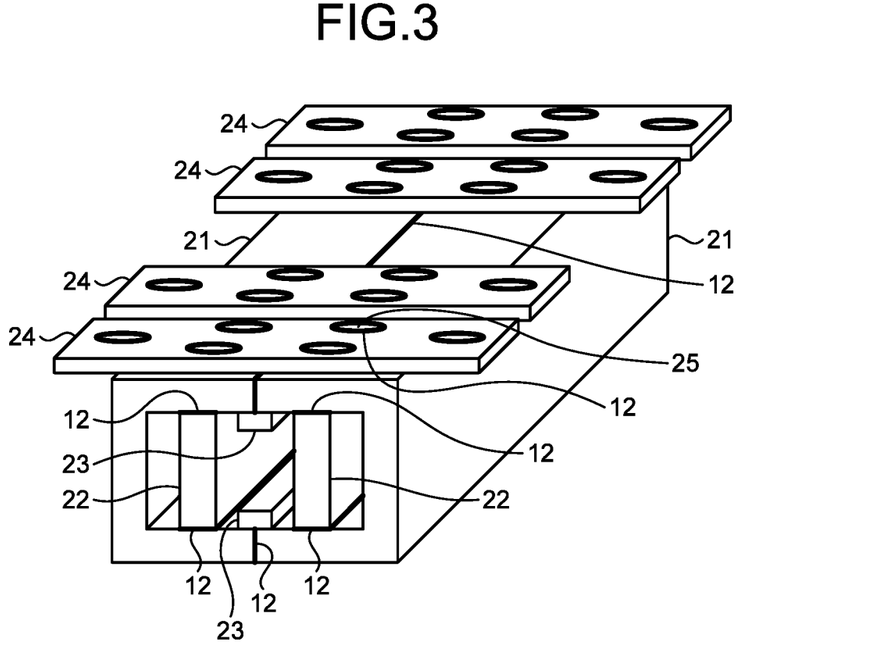
FIG. 3 is a view for illustrating an example of a structure of a side beam according to an embodiment.

FIG. 3 is a view for illustrating an example of a structure of the side beam 10 according to the embodiment. The reference sign 12 indicates weld lines in the drawing. Constituents of the side beam 10 are steel members 21, fillets 22, backing strips 23, and axle spring seats 24. The material of the steel members 21 is SM490Y, for example. Each of the axle spring seats 24 has through holes 25 provided therein.

Figure 4:
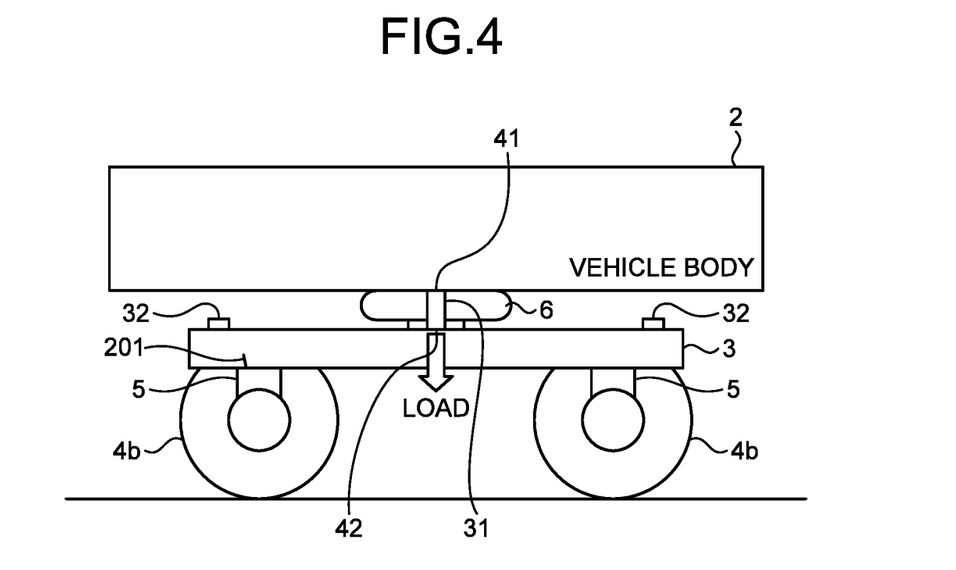
FIG. 4 is a schematic view illustrating an example of a nondestructive inspection method according to the embodiment.

FIG. 4 is a schematic view illustrating an example of the nondestructive inspection method according to the embodiment. Sensors 32 are installed in an object in which damage is detected, which is the truck frame 3 in the case of FIG. 4.

A jack 31 (a hydraulic jack, for example) is then inserted between the vehicle body 2 and the truck frame 3. Next, operation of the jack 31 causes a loading part 41 to rise, thereby lifting the vehicle body 2. At this time, the load to lift the vehicle body 2 is applied to the truck frame 3 as the load on a supporting part 42 (a contact surface of the jack 31 and the truck frame 3) of the jack 31 (loading).

Then, with the vehicle body 2 is being lifted, the jack 31 being operated in the reverse direction lowers the loading part 41 and brings down the vehicle body 2. At this time, the load that has been applied to the supporting part 42 in order to lift the vehicle body 2 is removed (unloading).

By repeating this loading and unloading, a defect in the truck frame 3, for example, a crack that resides in the weld 12, is rubbed or grows, so that an elastic wave (AE) is generated. The AE is detected by the sensors 32. In the nondestructive inspection method according to the embodiment, this detected signal is analyzed to identify the position of a defect 201. Herein, the range of load determined by the minimum load and the maximum load when loading and unloading are repeated is referred to as a load range. For example, the load range includes a combination of a minimum load of 0 kN and a maximum load of 5 kN, and a combination of a minimum load of 0.5 kN and a maximum load of 10 kN.

Figure 5:
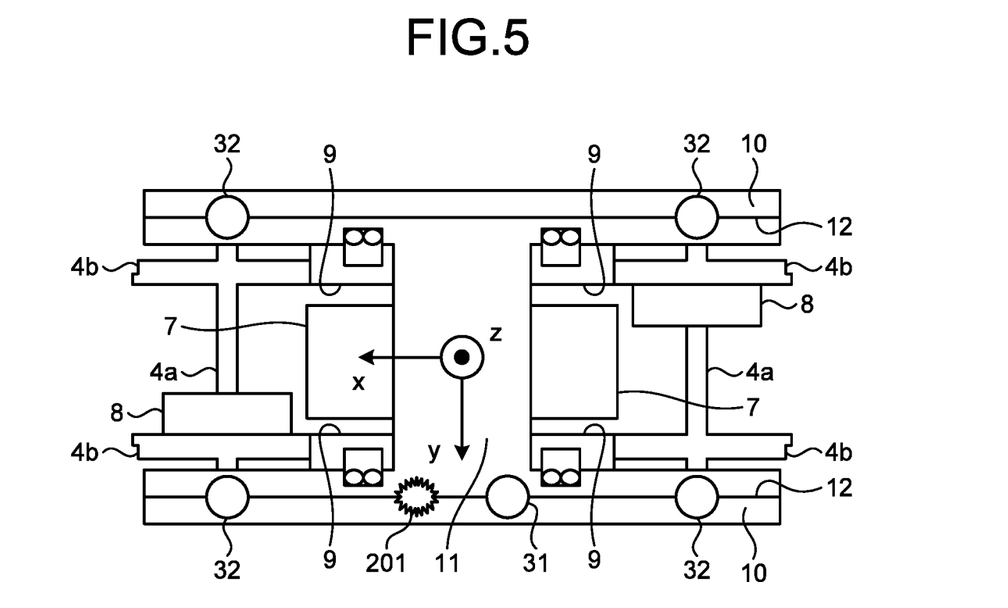
FIG. 5 is a view illustrating an example of arranging a jack and sensors according to the embodiment.

FIG. 5 is a view illustrating an example of arranging the jack 31 and the sensors 32 according to the embodiment. The sensors 32 are installed in a constituent of the truck 1, which is an object in which a defect such as a crack is detected, for example, in the truck frame 3. In the example of FIG. 5, four sensors 32 are installed in a region in which occurrence of a crack is concerned in the truck frame 3, for example, in the vicinity of the weld lines 12 on the truck frame 3. The number of the sensors 32 is not limited to four and may be any desired number.

In the example of FIG. 5, two sensors 32 each are installed in the vicinity of the respective weld lines 12 of the two side beams 10. The sensors 32 may be installed at positions other than those illustrated in FIG. 5 as long as an elastic wave that arises from a defect and propagates through the truck frame 3 can be detected efficiently.

For example, a plurality of the sensors 32 are installed on the weld lines 12 on the truck frame 3 of the truck 1, or within a range of a first distance from each of the weld lines 12.

For example, a plurality of the sensors 32 are installed outside a range of a second distance from a bolted joint in the truck frame 3 of the truck 1. This arrangement prevents the sensors 32 from detecting an AE that has been attenuated by propagating through a bolted joint.

The jack 31 to be placed in the truck 1 in order to lift the vehicle body 2 is placed in the vicinity of the weld line 12 on the truck frame 3, as illustrated in FIG. 5, for example. The jack 31 may be inserted in any desired position that enables a load to be applied to the truck frame 3, and may be inserted in the vicinity of the central part of the horizontal beam 11 in the truck frame 3, for example. The jack 31 placed in such a position lifts the vehicle body 2, thereby applying a load to the truck 1, which slightly deforms the entire truck 1, and an AE is generated from a defect, for example, the crack 201, in the truck frame 3, as described above. In the nondestructive inspection method according to the embodiment, the sensors 32 detect the generated AE, thereby locating the defect 201.

When the jack 31 lifts the vehicle body 2, it is not preferable to apply a load heavy enough to plastically deform the truck frame 3. Thus, the load range by the jack 31 is preferably kept within the elastic deformation range of the truck frame 3.

Example of a Functional Configuration

Figure 6:
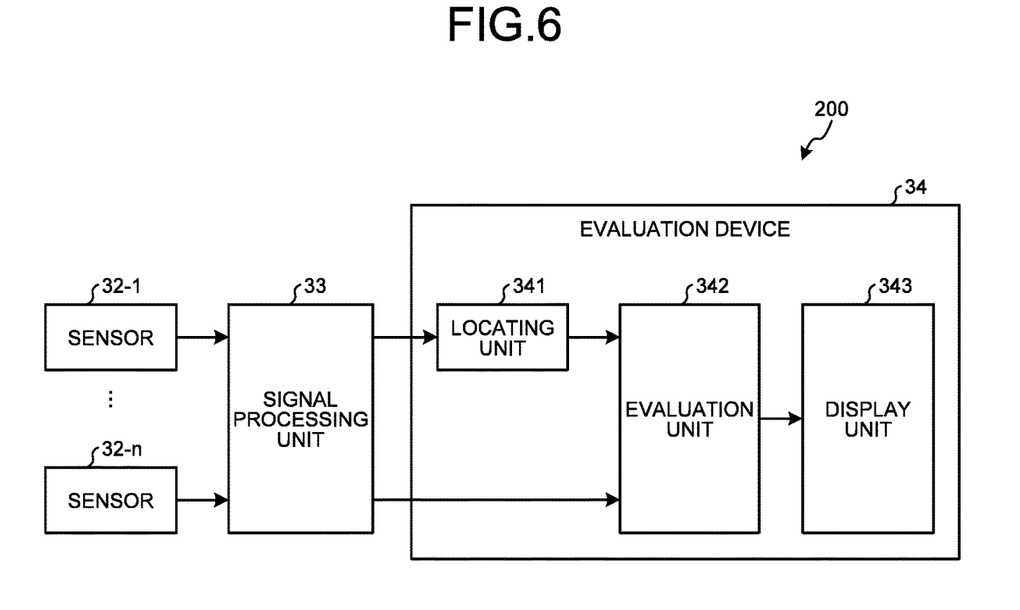
FIG. 6 is a view illustrating an example of a functional configuration of a nondestructive inspection system according to the embodiment.

FIG. 6 is a view illustrating an example of a functional configuration of a nondestructive inspection system 200 according to the embodiment. The nondestructive inspection system 200 according to the embodiment includes sensors 32-1 to 32-$n$ ($n$ is an integer equal to or greater than two), a signal processing unit 33, and an evaluation device 34. The evaluation device 34 includes a locating unit 341, an evaluation unit 342, and a display unit 343.

The nondestructive inspection system 200 is used to evaluate the soundness of the truck 1. Although the present embodiment is described by taking the truck 1 for a railroad as an example, the object is not limited to the truck 1 for a railroad. For example, the object may be anything as long as it is a structure in which an elastic wave is generated along with a crack occurring or proceeding, or external impact, and that supports the load of a substructure placed on top thereof.

The signal processing unit 33 and the evaluation device 34 are connected to each other in a communicable manner through wire or wirelessly. In the following description, the sensors 32-1 to 32-$n$ are described as the sensors 32 when not distinguished from each other.

The sensors 32 are installed in the truck 1. For example, the sensors 32 are installed in the truck frame 3 of the truck 1 for a railroad. The sensors 32 each have a piezoelectric element, detect an elastic wave (AE wave) propagating through the truck frame 3, and convert the detected elastic wave into a voltage signal (AE source signal). The sensors 32 apply processing, such as amplification and frequency control, to the AE source signal, and input the AE source signal to the signal processing unit 33. The sensors 32 are not limited to those that have a piezoelectric element, and may be those that detect an elastic wave propagating through a solid and convert the elastic wave into an electric signal. For example, the sensors 32 may be micro electromechanical system (MEMS) sensors that have a piezoresistor.

Upon receipt of the AE source signal to which the sensors 32 have applied processing, the signal processing unit 33 perform needed signal processing such as noise removal and parameter extraction, on the AE source signal, thereby extracting an AE feature amount including information regarding the elastic wave. The information regarding the elastic wave includes, for example, the amplitude, energy, rise time, duration, frequency, and zero cross count of the AE source signal.

The signal processing unit 33 inputs, to the evaluation device 34, information based on the extracted AE feature amount. The information based on the AE feature amount includes, for example, the sensor ID, the AE detection time, the amplitude, energy, rise time, and frequency of the AE source signal.

Herein, the amplitude of the AE source signal is, for example, a value of the maximum amplitude of elastic waves. The energy is, for example, a value obtained by integrating the square of the amplitude at points in time with time. The definition of energy is not limited to the above example, and may be an approximate value obtained by using a waveform envelope, for example. The rise time is, for example, a time T1 between when the elastic wave is a value of zero and when the elastic wave rises above a predetermined value. The duration is, for example, time between when the elastic wave starts rising and when the amplitude falls below a predetermined value. The frequency is a frequency of the elastic wave. The zero cross count is, for example, the number of instances in which the elastic wave cuts across a reference line passing through the zero value.

The locating unit 341 receives, from the signal processing unit 33, the information based on the AE feature amount. The locating unit 341 holds in advance information indicating positions of the sensors 32 installed in the truck 1 (hereinafter referred to as "sensor positional information") in correspondence with sensor IDs. Information indicating installation positions includes, for example, the distance from a specific position of the truck 1 in the horizontal direction and the vertical direction. The locating unit 341 locates the position of the AE source on the basis of the information based on the AE feature amount (the sensor ID and AE detection time, etc.) and the sensor positional information.

The locating unit 341 uses position locating results over a period of time so as to derive an AE source density distribution (emission source distribution). The AE source density distribution shows the emission source of the elastic wave generated in the truck (see FIG. 7 to be described later). The locating unit 341 inputs the derived AE source density distribution to the evaluation unit 342.

The evaluation unit 342 receives, from the locating unit 341, the AE source density distribution, and receives, from the signal processing unit 33, the information based on the AE feature amount. The evaluation unit 342 evaluates the soundness of the truck 1, particularly positional information on a defect such as a crack, on the basis of the AE source density distribution and the information based on the AE feature amount. For the information based on the AE feature amount, an AE signal amplitude and energy are used, for example. For example, the AE source signal amplitude and the energy are used to remove data having a value equal to or less than a predetermined value, which enables reliable data to be obtained.

The evaluation unit 342 causes the display unit 343 to display an evaluation result obtained by processing of the evaluation unit 342.

The display unit 343 is an image display device such as a liquid crystal display and an organic electroluminescent (EL) display, for example. The display unit 343 displays the evaluation result under the control of the evaluation unit 342. The display unit 343 may be an interface through which to connect the image display device to the evaluation device 34. In this case, the display unit 343 generates a video signal for displaying the evaluation result, and outputs the video signal to the image display device connected to the display unit 343.

The example of FIG. 6 illustrates the case in which the signal processing unit 33 is provided outside the evaluation device 34 as an edge computer, for example. However, the signal processing unit 33 may be provided inside the evaluation device 34.

Figure 7:
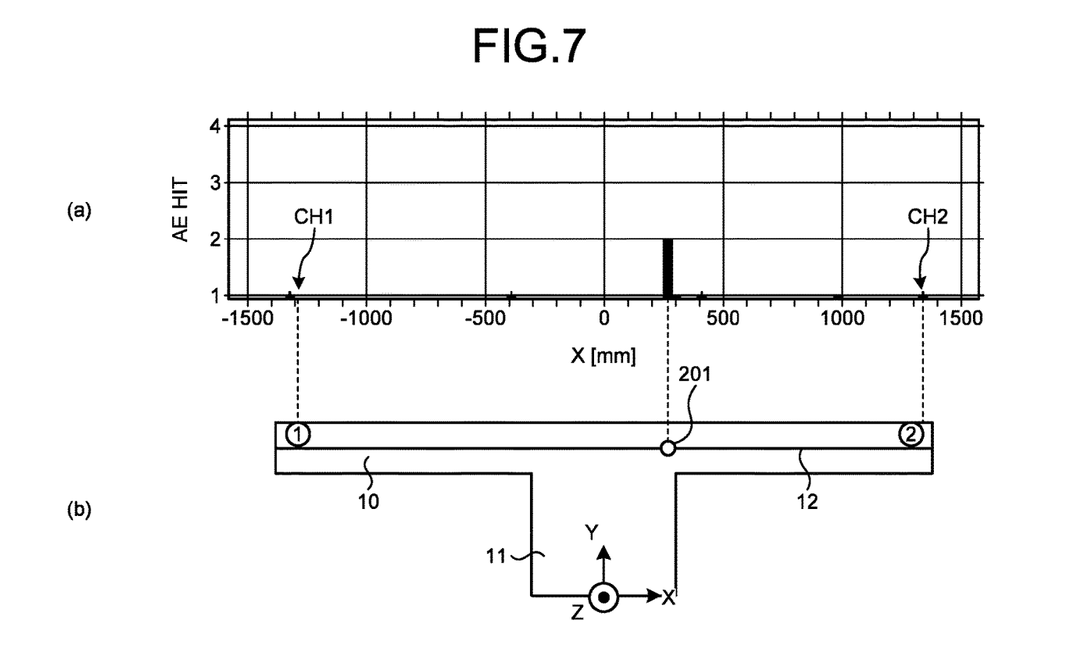
FIG. 7 is a view illustrating an example of an AE source density distribution (emission source distribution) according to the embodiment.

FIG. 7 is a view illustrating an example of an AE source density distribution (emission source distribution) according to the embodiment. The example of FIG. 7 illustrates a result of locating a position one-dimensionally by two sensors 32 for the sake of simplicity. FIG. 7 illustrates, at (a), an AE source density distribution in the extension direction (x direction) of the side beam 10. FIG. 7 illustrates, at (b), positions of the sensors 32 installed on the side beam 10 to be measured. In the example at (b) in FIG. 7, one sensor 32 each (CH1 and CH2) is installed in the vicinity of either edge of the side beam 10.

In the example at (a) in FIG. 7, as a result of locating the position on the basis of signals detected by the sensors 32 of CH1 and CH2, a point having a high AE source density is present in the vicinity of the central part slightly to the right of the side beam 10 (x=about 280 mm). The position suggested by this point on the side beam 10 corresponds to the defect 201 illustrated at (b) in FIG. 7. This result identifies the point on the weld line 12 as a defect position in consideration of the fact that a crack occurs easily on the weld line 12 of the side beam 10.

Example of a Nondestructive Inspection Method

Figure 8:
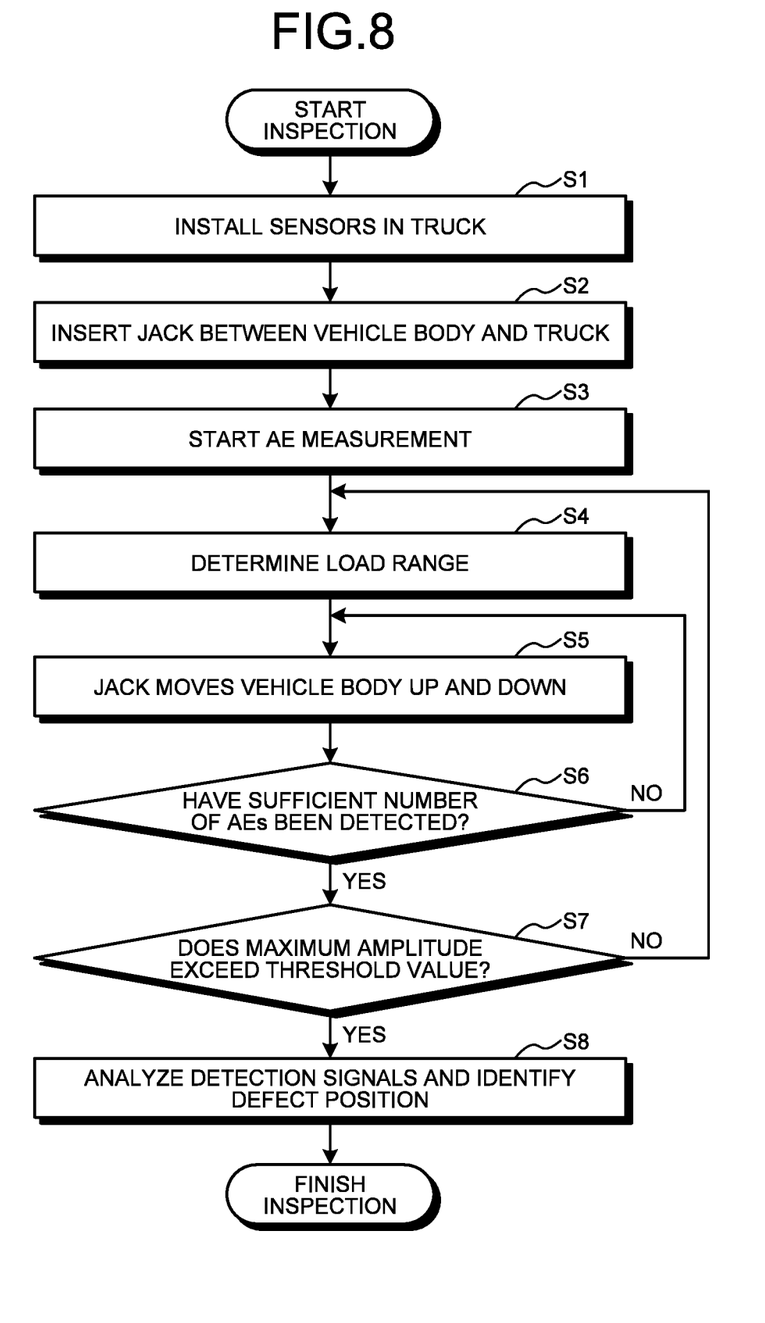
FIG. 8 is a flow chart illustrating an example of the nondestructive inspection method according to the embodiment.

FIG. 8 is a flow chart illustrating an example of the nondestructive inspection method according to the embodiment. First, a plurality of the sensors 32 for detecting an elastic wave are installed in the truck 1, which is an object in which a defect such as a crack is detected (Step S1).

Subsequently, the jack 31 is inserted between the vehicle body 2 and the truck 1 (Step S2). The loading part 41 and the supporting part 42 of the jack 31 are respectively brought into contact with and fixed to the vehicle body 2 and the truck 1 through jigs as necessary.

Subsequently, the sensors 32 start measurement of an elastic wave (AE) (Step S3).

Subsequently, the load range by the jack 31 is determined (changed) (Step S4), and the jack 31 moves the vehicle body 2 up and down a predetermined number of times (Step S5). Specifically, the jack 31 applies upward pressure to the loading part 41 and lifts the vehicle body 2. The maximum upward pressure (the maximum load) is up to predetermined pressure within the elastic deformation range of the truck frame 3, and thereafter, the pressure is eliminated to lower the vehicle body 2.

Subsequently, the signal processing unit 33 determines whether a sufficient number of AEs have been detected (Step S6). The signal processing unit 33 monitors signals detected by the sensors 32, the signals of AEs generated while the vehicle body 2 is moved up and down. Until a sufficient number of AEs for subsequent evaluation can be detected, the vehicle body 2 is repeatedly moved up and down. In other words, if a sufficient number of AEs have not been detected (No at Step S6), the processing returns to Step S5.

If a sufficient number of AEs have been detected (Yes at Step S6), the signal processing unit 33 determines whether the maximum amplitude of AEs exceeds a threshold value (60 dBµ, for example) (Step S7). If the maximum amplitude of AEs is equal to or less than the threshold value (No at Step S7), the processing returns to Step S4. In other words, the load range is changed to a second load range different from the first load range, and the jack 31 (lifting member) moves the vehicle body 2 up and down.

If the maximum amplitude of AEs exceeds the threshold value (Yes at Step S7), the evaluation device 34 analyzes detection signals (Step S8). In analysis of the detection signals, AE signals are used that have been generated while the vehicle body is moved up and down, in other words, during loading and unloading of the vehicle body to and from the truck frame 3, in order to locate positions of the AE sources. In locating positions, it is desired that the evaluation device 34 extract, out of position locating results, a result that is more reliable in calculation. For example, the locating unit 341 calculates, as the position locating results, a distribution of a plurality of AE sources, and an AE source density distribution (normalized distribution of the AE sources) based on the distribution of the AE sources, and the evaluation unit 342 estimates (identifies) a portion with higher density as the position of the defect 201.

If the jack 31 (lifting member) moves the vehicle body 2 up and down in a plurality of different load ranges, and the maximum amplitude of elastic waves generated in a load range exceeds the threshold value, the vehicle body 2 may be further moved up and down a predetermined additional number of times in the relevant load range. In other words, AEs generated in a more effective load range may be detected by the sensors 32 more often.

Lastly, description will be given about an example of a hardware configuration of the evaluation device 34 in the nondestructive inspection system 200 according to the embodiment.

Example of a Hardware Configuration

Figure 9:
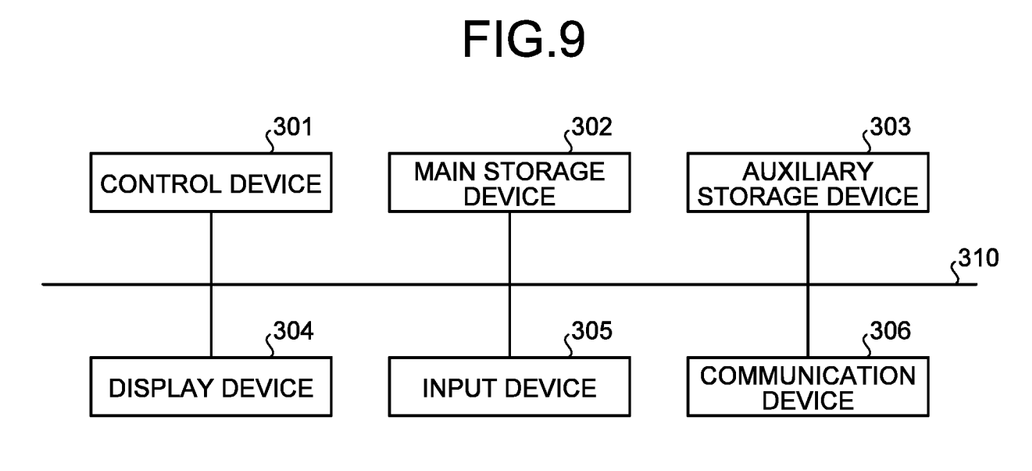
FIG. 9 is a view illustrating an example of a hardware configuration of an evaluation device in the nondestructive inspection system according to the embodiment.

FIG. 9 is a view illustrating the example of the hardware configuration of the evaluation device 34 in the nondestructive inspection system 200 according to the embodiment.

The evaluation device 34 includes a control device 301, a main storage device 302, an auxiliary storage device 303, a display device 304, an input device 305, and a communication device 306. The control device 301, the main storage device 302, the auxiliary storage device 303, the display device 304, the input device 305, and the communication device 306 are connected to each other via a bus 310.

The control device 301 executes a computer program read from the auxiliary storage device 303 into the main storage device 302. The control device 301 is, for example, a processor, such as a central processing unit (CPU).

The main storage device 302 is memory such as read only memory (ROM) and random access memory (RAM). The auxiliary storage device 303 is a hard disk drive (HDD), a solid state drive (SSD), a memory card, and the like.

The display device 304 displays display information. The display device 304 is, for example, a liquid crystal display. The input device 305 is an interface through which to operate a computer. The input device 305 is, for example, a keyboard and a mouse. In a case in which the computer is a smart device such as a smartphone and a tablet terminal, the display device 304 and the input device 305 are, for example, touch panels. The communication device 306 is an interface through which to communicate with another device.

A computer program executed by the computer is provided as a computer program product by being recorded into a computer-readable storage medium such as a flexible disk, a magneto-optical disk, ROM, CD-ROM, a memory card, CD-R, and a digital versatile disc (DVD), in an installable or executable file format.

The computer program executed by the computer may also be configured to be provided by being stored on the computer connected to a network, such as the Internet, and being downloaded over the network. The computer program executed by the computer may also be configured to be provided over a network such as the Internet, without being downloaded.

The computer program executed by the computer may also be configured to be provided by being preinstalled on a ROM or the like.

The computer program executed by the computer has a modular configuration including functional blocks, in the functional configuration (functional blocks) of the evaluation device 34 described above, that can also be implemented by the computer program. As actual hardware, the control device 301 reads the computer program from a storage medium and executes the program, whereby the functional blocks are loaded into the main storage device 302. In other words, the aforementioned functional blocks are generated on the main storage device 302.

The functional blocks may be implemented in whole or in part using hardware such as an integrated circuit (IC), not using software. For example, the functions of the evaluation device 34 may be implemented in whole or in part using hardware such as an application specific integrated circuit (ASIC), a programmable logic device (PLD), and a field-programmable gate array (FPGA).

In a case in which a plurality of processors are used to implement the functions, each processor may implement one of the functions, or may implement two or more of the functions.

The operation mode of a computer to implement the evaluation device 34 may be optional. For example, the evaluation device 34 may be implemented by a single computer. For example, the evaluation device 34 may also be operated as a cloud system on a network.

As described above, the nondestructive inspection method according to the embodiment includes: detecting, by the sensors 32 installed in the truck 1 that supports the vehicle body 2, elastic waves generated when the lifting member (the jack 31) inserted between the vehicle body 2 and the truck 1 moves the vehicle body 2 up and down; and estimating, by the evaluation device 34, a position of a defect in the truck 1 on the basis of the elastic waves detected by the sensors 32.

For example, attempts have been made to detect a fatigue crack on a railroad truck through ultrasonic flaw detection, but it takes time to apply substrate treatment to an object to be inspected, and the object is expected to be scanned by a probe.

With the nondestructive inspection method according to the embodiment described above, the timescale can be further shortened for an inspection to estimate the position of the defect 201. For example, in a case in which substrate treatment is expected for an object to be inspected, substrate treatment may be applied to positions where the sensors 32 are installed, so that time for substrate treatment can be shortened compared with a case in which an object to be inspected is scanned by a probe.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A nondestructive inspection method comprising:
   detecting, by a plurality of sensors installed in a truck that supports a vehicle body, an elastic wave generated when a lifting member inserted between the vehicle body and the truck moves the vehicle body up and down; and
   estimating, by an evaluation device, a position of a defect in the truck, based on the elastic wave detected by the plurality of sensors.

2. The method according to claim 1, wherein at the estimating, an emission source distribution of the elastic wave is derived based on the elastic wave detected by the plurality of sensors, and the position of the defect in the truck is estimated from the emission source distribution.

3. The method according to claim 1, wherein a load range by the lifting member when the vehicle body is moved up and down is within an elastic deformation range of the truck.

4. The method according to claim 1, further comprising:
moving, in a case in which a maximum amplitude of the elastic wave generated in a first load range is equal to or less than a threshold value, the vehicle body up and down by the lifting member in a second load range different from the first load range; and
determining to estimate a position of a defect in the truck by the evaluation device, based on the elastic wave in a case in which a maximum amplitude of the elastic wave exceeds a threshold value.

5. The method according to claim 1, further comprising moving, in a case in which the lifting member moves the vehicle body up and down in a plurality of different load ranges, and the maximum amplitude of the elastic wave generated in a first load range exceeds a threshold value, the vehicle body up and down a predetermined additional number of times in the first load range.

6. The method according to claim 1, wherein the plurality of sensors are installed on a weld line in a truck frame of the truck, or within a range of a first distance from the weld line.

7. The method according to claim 1, wherein the plurality of sensors are installed outside a range of a second distance from a bolted joint in a truck frame of the truck.

8. A nondestructive inspection system comprising:
a plurality of sensors configured to detect an elastic wave generated when a lifting member moves a vehicle body up and down from a truck that supports the vehicle body;
a locating unit configured to derive an emission source distribution of the elastic wave, based on the elastic wave detected by the plurality of sensors; and
an evaluation unit configured to estimate a position of a defect in the truck from the emission source distribution.

\* \* \* \* \*